Nov. 21, 1967  E. R. EVANS  3,353,581
NUT FASTENER
Filed June 18, 1965  2 Sheets-Sheet 1

INVENTOR.
EDWIN R. EVANS, DECEASED,
BY THE DETROIT BANK & TRUST COMPANY, EXECUTOR

Whittemore, Hulbert & Belknap
ATTORNEYS

Nov. 21, 1967  E. R. EVANS  3,353,581
NUT FASTENER
Filed June 18, 1965  2 Sheets-Sheet 2

INVENTOR.
EDWIN R. EVANS, DECEASED,
BY THE DETROIT BANK & TRUST COMPANY, EXECUTOR

Whittemore, Hulbert & Belknap
ATTORNEYS

United States Patent Office 3,353,581
Patented Nov. 21, 1967

3,353,581
NUT FASTENER
Edwin R. Evans, deceased, late of Orchard Lake, Mich., by The Detroit Bank and Trust Company, executor, Detroit, Mich., assignor to Lock Thread Corporation, Detroit, Mich., a corporation of Delaware
Filed June 18, 1965, Ser. No. 465,213
11 Claims. (Cl. 151—22)

This application is a continuation-in-part of copending applications, Ser. No. 823,739 filed June 29, 1959, now abandoned, and Ser. No. 139,748 filed Sept. 21, 1961, now abandoned. The invention relates generally to fasteners and refers more particularly to threaded lock fasteners.

There are numerous so-called lock-nut fasteners. Most of these include a nut member deformed, after tapping, in some manner, as by permanently deforming or punching locally to obtain a small local pressure engagement. Although such fasteners provide certain advantages, they are generally inadequate to obtain consistent assembly torque, due to highly variable contact, and therefore are unsuitable for use in many instances where uniform tensile loading is desired.

Certain of the presently known lock-nut fasteners are flattened or distorted locally to a small degree so that a threaded member received therein is initially gripped by the foreshortened areas. Unfortunately, this causes the threaded member to be appreciably less securely engaged on the in-between flank areas of the nut fastener and eventually results in a loose fit because of thread wear at the foreshortened areas. The distorted areas may, in some cases, occur at the root of the nut thread and in other cases at the base of the nut tooth and flanks.

Those lock-nut fasteners which are devoid of threads at circumferentially spaced intervals, to provide added resiliency to the threaded sectors or to provide thread biting corners, are likewise deficient because they do not provide enough thread surface contact to obtain uniform assembly torque and assure permanent locking effect. Also much area useful against stripping is lost, requiring thicker blanks to equal the strength of regular nuts.

An essential object of this invention is to provide a threaded fastener having a self-locking character capable of assuring permanent locking effect, more uniform tensile loading and greater strength.

Another object is to provide a lock-nut having a continuous internal thread the crest radius of which is non-uniform so that when engaged with a bolt the crest of the nut thread can have an interrupted friction locking engagement with the root of the bolt thread and the thread flanks can be in continuous engagement.

Another object is to provide engaging threaded male and female members wherein the female member has a continuous internal thread of non-uniform crest radius, and the male member has a continuous external thread of uniform root radius between the minimum and maximum crest radius of the internal thread of the female member for interrupted friction locking engagement therewith.

Another object is to provide engaging threaded male and female members wherein the crest-root friction locking engagement is uniform.

Another object is to provide engaging threaded male and female members wherein the crest-root friction locking engagement at the interrupted areas of engagement is a maximum at the mid-point of the areas and progressively less to either side thereof.

Another object of this invention is to provide a fastener having integral circumferential resilient beam segments to improve the locking action.

Another object is to provide the combination of a nut, constructed to be free running on a standard bolt, and a special bolt with which the nut will lock.

Another object of this invention is to provide a threaded fastener having effective relieved spaces for the accumulation of foreign particles which are prone to roll onto the contacting surfaces and cause galling, and to provide such spaces without sacrificing thread flank engagement or strength.

Another object of this invention, closely related to the last mentioned object, is to provide relieved spaces for the distribution of lubricant, when it is needed at the root surfaces. It has been found that nuts having continuous crest-root contact cannot be effectively lubricated with petroleum or similar lubes because they are excluded by band pressure. Additionally it has been found that, after long standing any thin coating of oil becomes useless with resulting corrosion and loss of bolt tension.

A further object of this invention is to provide a nut fastener which is relatively simple and economical to manufacture.

Other objects and features of the invention will become apparent as the following description proceeds, especially when taken in conjunction with the accompanying drawings wherein.

Figure 1:
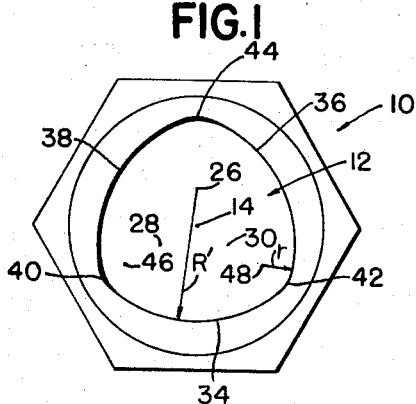
FIGURE 1 is a plan view of a nut blank prior to the formation of threads therein.

Referring to FIGURE 1, the hexagonal nut blank 10 is formed with a generally triangular central perforation 12, the longitudinal elements of the surface of which all are straight and parallel to the central axis 14 in the nut.

Figure 12:
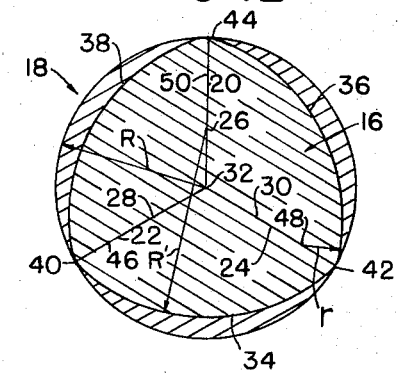
FIGURE 12 illustrates in cross section punch which may be employed to form the aperture in the nut blank of FIGURE 1, shown enlarged.

The perforation 12 may be formed by a suitable punch 16, FIGURE 12, having a cross section identical to the aperture 12 in the nut blank 10. This punch may be formed from an initial cylindrical blank 18 in a form grinding machine. The initial cylindrical blank has a radius R. The radial construction lines 20, 22 and 24 are spaced angularly from one another 120 degrees and on these lines are the centers 26, 28 and 30 spaced equal distances from the axis 32 of the cylindrical blank 18. The lands 34, 36 and 38 of the tool formed from the cylindrical blank are arcuate surfaces of radius R′, the centers of which are respectively located at 26, 28 and 30. The corners or lobes 40, 42 and 44 of the tool are arcuate surfaces the centers of which are respectively at points 46, 48 and 50 on the lines 20, 22 and 24. The arcuate lobes are of a radius $r$ selected to blend or merge tangentially with the lands on either side thereof. The longitudinal elements of the surface of the tool are straight and parallel to the central longitudinal axis 32.

Upon removal of the surface stock of the cylindrical blank shown in section in FIGURE 12, the tri-lobe tool or punch 16 is obtained which, when axially aligned with the nut blank in FIGURE 1, is advanced to form the aperture 12 therein.

The lands and lobes (or flutes) of aperture 12 in FIGURE 1, and centers from which such lands and lobes are formed, have been given the same characters of reference as the corresponding lands, lobes, and centers of the tool 16 in FIGURE 12. While the radius of curvature $r$ of the lobes or flutes 40, 42 and 44 is smaller than the radius of curvature R′ of lands 34, 36 and 38, the lobes or flutes may be considered to be of larger radius than the lands in the sense that they are farther from the center or central axis 14 of the aperture.

Figure 2:
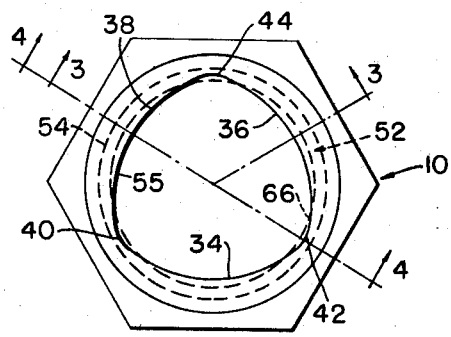
FIGURE 2 is a plan view of the nut after the formation of threads therein.
Figure 3:
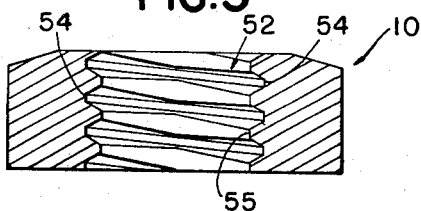
FIGURE 3 is a sectional view taken on the line 3—3 of FIGURE 2.

After the aperture 12 has been formed in the nut blank, it is threaded by a suitable tap which forms a single continuous internal spiral thread in the aperture, the thread being designated 52 in FIGURE 2. The radius of the root 54 of the thread is uniform throughout the length of the thread so that an axial projection of the thread is a cylinder whose center coincides with the center 14 of the aperture 12 in the nut blank, as seen in FIGURE 2. The tap may be a standard tap so that it does not alter the crest diameter of the threads from that initially established by the punch 16. In other words, the lands and lobes formed by the perforating tool define and determine the thread crest 55 which, as seen in FIGURE 2, is of varying radius. The crest 55, in axial section, is straight and parallel to the nut axis 14. The thread flanks are tapered and uniform in radius throughout their circumferential extent.

The thread thus formed is a continuous thread which is of full depth at the center of the lands 34, 36 and 38 and which is of gradually decreasing depth in either direction therefrom, reaching a minimum depth (or maximum relief) at the centers of the flutes or lobes 40, 42 and 44.

A special bolt 60 has a continuous thread 62 adapted to mate with the thread 52 of the nut. The crest radius adn the root radius of thread 62 are uniform throughout the length thereof. The axial projection of the crest 64 defines a cylinder concentric with the central axis of the bolt. The root 66 may likewise, if desired, have a cylindrical axial projection concentric with the bolt axis, or it may be tapered as shown dotted in FIGURE 5 up to 15° and preferably about 6°. The uniform root radius of the bolt thread 62 is between the minimum and maximum crest radius of the internal thread of the nut; that is, it is greater than the distance from the axis 14 of the perforation in the nut of the centers of the lands 34, 36 or 38, but less than the distance from the axis 14 to the centers of a lobe 40, 42, or 44. The thread flanks of the bolt are tapered and uniform in radius throughout their circumferential extent.

Figure 4:
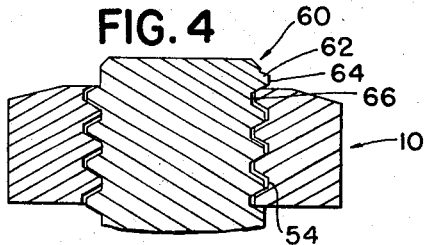
FIGURE 4 is a sectional view taken on the line 4—4 of FIGURE 2, showing a special bolt threadedly engaged in the nut.
Figure 8:
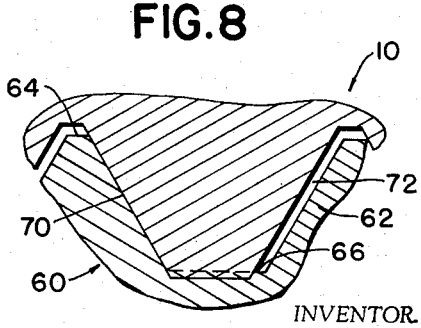
FIGURE 8 is an enlarged fragmentary section illustrating the interfering crest-root engagement of the nut and special bolt threads at the left in FIGURE 4.
Figure 9:
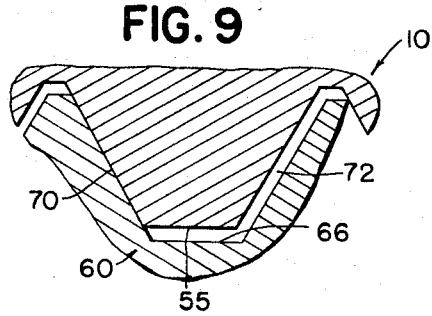
FIGURE 9 is an enlarged fragmentary cross section illustrating the non-interfering engagement of the nut and bolt threads at the right in FIGURE 4.

When the bolt is thread into the nut as in FIGURE 4, the bolt thread root will have an interfering fit with the crest of the nut thread, causing compression of the interfering material. Interference is a maximum at the centers of the lands 34, 36 and 38 and diminishes progressively to either side of the centers thereof, and the root of the bolt thread will be free of engagement of the crest of the nut threads at the lobes or flutes 40, 42 and 44 thereof. This can be seen in FIGURES 8 and 9. FIGURE 8 shows the interfering fit at the center of a land, and FIGURE 9 shows the relief 67 between the crest and the root of the engaging threads at the center of a lobe. The interfering crest-root contact of the threads at angularly spaced points produces a friction lock. The crest of the nut thread and the root of the bolt thread are of substantial width to provide broad load-bearing surfaces. The relieved spaces 67 provide for even distribution of lubricant between the threads. They also collect any foreign particles which might otherwise be rolled between the mating threads surfaces which could cause galling.

The pitch diameter of the nut 10 is tapped sufficiently high to avoid flank interference with the bolt. Referring to FIGURES 4, 8 and 9, while there is shown a continuous flank engagement 70 of the threads along one side thereof, here is a continuous flank relief or clearance 72 along the other side. Flank relief at 72 is desirable because it reduces running torque—that torque required to run the nut on the bolt—and also because it provides a space into which the interfering material can be displaced.

There is dotted in FIGURE 2 the axial projection of the thread root 66 of the bolt. This will illustrate the amount of interference between the bolt thread root and the nut thread crest and will illustrate also the maximum interference at the center of the lands 34, 36 and 38 forming the nut thread crests, which interference diminishes progressively to either side of the center.

The nut 10 is formed of metal or any other suitable flexible, resilient material, and the radial thickness of the nut is least at the center of the lobes. Hence the circumferential portions of the nut extending from the center of each lobe to the centers of the adjacent lobes are resilient deflecting beams. The interference between the crest of the nut thread and the root of the bolt thread is a maximum at centers of the lands, and hence the resilient deflecting beam portions of the nut can expand. The portions of the nut at the centers of the lands move radially outwardly, and the portions at the centers of the lobes move radially inwardly.

The nut aperture has five flutes or lobes or less, and preferably three (tri-lobe), as shown. One advantage of a 3-fluted nut is better centering of the thread forming tap. Another advantage of a 3-fluted nut is that equal distribution of the pressure areas assures centralization of the bolt engaged therein, and a corresponding equalization of the resultant drag torque. However, a two-lobe aperture, or one with more than three, four or five lobes, is feasible. It is obvious that the deflecting beams of a two-lobe aperture would be longer than those of an aperture with three lobes or flutes.

It will be appreciated that for the nut and bolt of FIGURE 4 there is 360° of thread flank loading engagement at 70, i.e., flank pressure loading completely around the bolt to resist loosening due to vibration under load. Moreover, the bolt is centered and pressure on the bolt is equalized due to the location of the pressure areas at equally spaced areas around the bolt. The full flank engagement of the threads also provides a maximum shear resistance to stripping.

Referring to FIGURE 8, the fragmentary thread section of the nut 10 shows the thread contour where the internal thread height is greatest. In other words, the section is taken through the center of a land where a maximum interference will occur. The internal thread height at this point, which as stated is a maximum, is no greater than $.61343p$ where $p$ is equal to the thread pitch.

Figure 6:
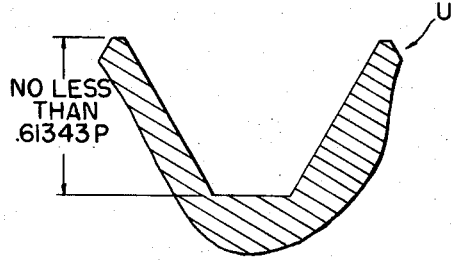
FIGURE 6 is an enlarged fragmentary section of a standard Unified bolt thread.
Figure 7:
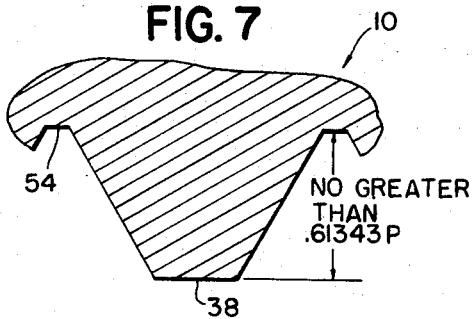
FIGURE 7 is an enlarged fragmentary section of the nut thread at the left in FIGURE 4, where the thread is of maximum height, for interference with the root of the special bolt.

Referring to FIGURE 6, there is shown a fragmentary section of the thread of a standard Unified bolt U but without optional rounded root. This Unified bolt U thread form is shown on page 11 of the H–28 Handbook dated 1957, and has an external thread height of no less than $.61343p$, as called for in Table III, 1, page 12.

The pitch diameter of the nut 10 will be tapped sufficiently high (being UN–1, 2 or 3B limits) to avoid flank interference on the Unified bolt U shown in FIGURE 6, and because of the thread height of the Unified bolt and nut 10 there will be no crest-root interference. Therefore, the nut 10 will be free running on the Unified bolt.

Figure 5:
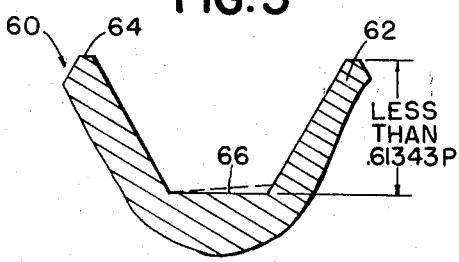
FIGURE 5 is an enlarged fragmentary section of the special bolt threads.

The external thread height of the special bolt 60 shown in FIGURE 5 is seen to be less than .61343p. Therefore, it will be apparent that interference will result between the root of the special bolt 60 and the circumferentially spaced lands of the thread crest of nut 10. This interference is shown in FIGURE 8. Preferably, there will be spaces or voids between the root of the male thread of bolt 60 and the crest of the female thread of nut 10 between the points of maximum interference, that is in the regions of the flutes or lobes 40, 42 and 44. However, while such spaces or voids are preferred, it is in the broader sense only necessary that the interference be relieved at these points.

Preferably, the root of the thread of bolt 60 slopes or diverges as shown in a direction away from the direction of load.

The pitch diameter of the nut 10 is sufficiently high to avoid flank interference on the special bolt 60.

It will thus be seen that while the nut 10 will lock on the special bolt 60, it will be free running on the standard Unified bolt U.

Figure 10:
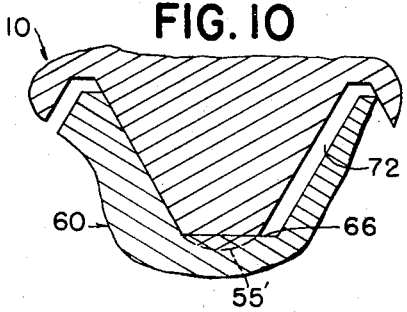
FIGURE 10 is similar to FIGURE 8 but shows a modification.
Figure 11:
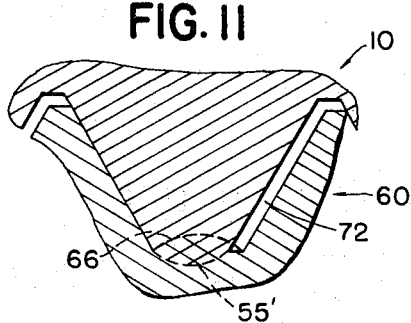
FIGURE 11 is likewise similar to FIGURE 8 but shows a further modification.

FIGURE 10 illustrates a modification of the invention in which the nut thread crest 55′ is curved or arcuate in axial section. FIGURE 11 illustrates a further modification in which the nut thread crest 55′ is curved or arcuate in axial section and the bolt thread root is also curved or arcuate in axial section. Otherwise the parts in FIGURES 10 and 11 are exactly the same as in FIGURES 1–5 and 7–9, it being understood that the sections in FIGURES 10 and 11, like FIGURE 8, are taken at the center of the land of a nut thread crest, which is the point of maximum interference. The maximum internal thread height of the nuts in FIGURES 10 and 11 is the same as for the nut in FIGURES 2–4, 7 and 8, and the external thread height of the bolts in FIGURES 10 and 11 is the same as for the bolt in FIGURES 4, 5, 8 and 9.

Figure 13:
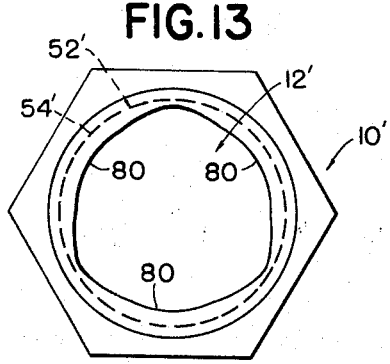
FIGURE 13 is similar to FIGURE 2 but shows a modification.

FIGURE 13 is similar to FIGURE 2 but shows a nut 10′ having a slightly modified construction. The aperture 12′ in this nut may be initially formed by a tool like tool 16 shown in FIGURE 12, but thread 52′ therein is formed by a controlled root tap. The radius of the root 54′ of the thread is uniform throughout the length of the thread and exactly the same as the root 54 of thread 52 in FIGURE 2. Since the thread is formed by a controlled root tap however, the shape of the aperture, and hence the crest of the thread is modified or trimmed to form the arcuate surfaces 80 in the lands 34′, 36′ and 38′ which have the same radius or curvature and are concentric with the center 14′ of the aperture. It will be understood of course that the three arcuate surfaces 80 in each convolution of the thread are exactly the same and in longitudinal alignment so that the aligned surfaces 80 form longitudinal flutes at 120° intervals.

Figure 14:
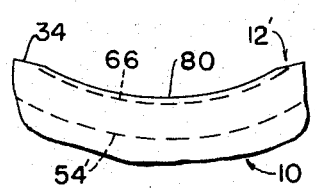
FIGURE 14 is an enlargement of a portion of FIGURE 13.

The same bolt 60 is to be engaged with the nut 10′. In FIGURE 14, which is an enlargement of a portion of FIGURE 13, the axial projection of the thread root 66 of the bolt is dotted in. This will illustrate the amount of interference between the bolt thread root and the surface 80 of one of the nut thread crests. The interference is the same at the other reliefs. Due to the arcuate shape of the surfaces, which are concentric with the bolt thread root, interfence will be uniform from one end of each surface to the other and then will progressively diminish for a short distance to either side thereof.

There will of course be continuous flank relief or clearance along one side of the threads of the nut and bolt. In this connection, FIGURE 8 may also be considered as a section of the thread engagement between the bolt and nut 10′ at the center of a surface 80 in the land portions of the nut thread crests, and FIGURE 9 may be considered a section of the thread engagement at the lobes where there is crest-root relief. The flexing beam sections of nut 10′ are the same as nut 10.

The maximum internal thread height of the nut 10′ is the same as for nut 10.

Figure 15:
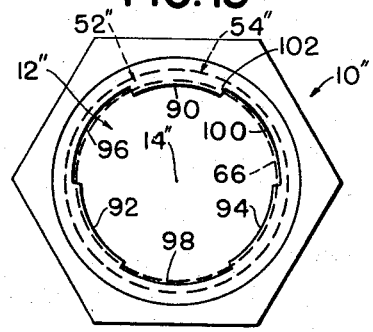
FIGURE 15 is similar to FIGURE 2 but shows a modification.

FIGURE 15 shows still another modification in which the nut 10″ has an aperture 12″ therein formed of the uniformly spaced arcs 90, 92 and 94 which are of the same radius and have a common center 14″. Between these arcs are the arcs 96, 98 and 100 which are of the same but larger radius having a common center coinciding with the center 14″. The alternate large and small arcs are joined by the radial surfaces 102. The aperture forms the thread crests and has the same cross section throughout its longitudinal extent.

This nut is also formed with a continuous thread 52″ the root radius 54″ of which is uniform throughout the length of the thread and exactly the same as the root radius of the thread 52. The crest of the thread however is determined by the configuration of the aperture so that the thread is full at the arcs 90, 92 and 94 and relieved therebetween.

The nut 10″ is designed for threaded engagement with the bolt 60 and the axial projection of the bolt thread root 66 is dotted in FIGURE 15. Hence it will be seen that there is a uniform interference between the bolt thread root and the arcuate surfaces 90, 92 and 94 of the nut thread crest, and crset-root relief along the arcs 96, 98 and 100.

There will of course be continuous flank relief along one side of the threads. FIGURE 8 may be taken as a section through the threads of the bolt and nut 10″ showing the interference between the bolt root and a surface 90, 92 or 94 of the nut crest, and FIGURE 9 may be taken as an illustration of the clearance between the bolt root and a surface 96, 98 or 100 of the nut crest.

The maximum internal thread height of the nut 10″ is the same as for nut 10.

The flexing circumferential beam sections of nut 10″ extend from the middle of one thread crest relief 96, 98, 100 to the middle of the others. It will be understood that in the modifications of FIGURES 13, 14 and 15, the nut crest may be crowned, as in FIGURE 10, or both the nut crest and thread root may be crowned as in FIGURE 11, which can be expected to provide more resiliency within the elastic limit, permitting greater manufacturing limits and interference.

In each of the embodiments illustrated it is desirable and in fact ideal that the flex of the nut, or of the beam sections thereof, when applied to the bolt be held within the elastic limits of the material so that the locking effect will always be the same whenever the nut is applied.

The first contacting thread crests of the nut or roots of the bolt may be reduced by chamfering or otherwise for the purpose of providing starting threads. The perforation in the hex nuts of FIGURES 13, 14 and 15 can be as shown with respect to the corners of the nut blank, or it can be rotated, for example 60° or any other angle found desirable.

What I claim as my invention is:

1. The combination of threadedly engaged male and female members, said female member having an aperture formed with a continuous internal female thread, the crest of said female thread in each of at least several convolutions having a plurality of circumferentially uniformly spaced lands located closer to the center of said aperture than the intervening portions thereof, the flanks and root of said female thread in each of the several convolutions aforesaid being uniformly spaced from the axis of said female member throughout the circumferential extent thereof, said female member having a maximum internal thread height no greater than 61343p, p being the thread pitch, said male member having an external thread height less than .61343p, the root of said male thread in those convolutions mating with the aforesaid convolutions of said female thread being uniformly spaced from the axis of said male member a distance greater than the spacing of said lands from the center of said aperture, whereby to provide a material interference between said crest of said female thread and said root of said male thread, relieved at the intervening portions of said crest, the crest and flanks in the aforesaid convolutions of said male thread being spaced uniformly from the axis of said male member and being free of interference with said female thread, said female member being substantially free running on a standard Unified bolt having an external thread height of no less than .61343p.

2. The combination defined in claim 1, wherein the crest of said female thread and the root of said male thread are of substantial width measured axially to provide broad load-bearing surfaces.

3. The combination defined in claim 2, wherein the flanks of said male thread are radially outwardly inclined toward one another and the flanks of said female thread are radially inwardly inclined toward one another, one pair of confronting flanks of said threads being spaced apart to provide axial clearance.

4. The combination defined in claim 3, wherein the distance from the center of the aperture to said lands is a minimum at the mid-points of said lands and gradually increases toward the ends of said lands for maximum crest-root interference at said mid-points, diminishing gradually toward said ends.

5. The combination defined in claim 3, wherein at least portions of said lands are of arcuate form centered on the axis of said female member.

6. The combination defined in claim 3, wherein said female member is formed of a flexible, resilient material and the portions thereof between said intervening portions constitute flexing beam sections, and the crest of said female thread has three lands per convolution.

7. The combination defined in claim 3, wherein said root of said male thread is spaced from the intervening portions of the crest of said female thread to provide voids between the circumferentially spaced points of crest-root interferences.

8. The combination defined in claim 3, wherein at least one of said crest and root surfaces is convexly curved.

9. The combination defined in claim 3, wherein said crest and root are convexly curved.

10. The combination of threadedly engaged male and female members, said female member having an aperture formed with a continuous internal female thread, the crest of said female thread in each of at least several convolutions having a plurality of circumferentially uniformly spaced lands located closer to the center of said aperture than the intervening portions thereof, the flanks and root of said female thread in each of the several convolutions aforesaid being uniformly spaced from the axis of said female member throughout the circumferential extent thereof, said male member having a thread height less than the maximum height of said female thread, the root of said male thread in those convolutions mating with the aforesaid convolutions of said female thread being uniformly spaced from the axis of said male member a distance greater than the spacing of said lands from the center of said aperture, whereby to provide a material interference between said crest of said female thread and said root of said male thread, relieved at the intervening portions of said crest, the crest and flanks in the aforesaid convolutions of said male thread being spaced uniformly from the axis of said male member and being free of interference with said female thread, said female member being free running on a standard bolt having an external thread height no less than the maximum thread height of said female member.

11. A female having an aperture formed with a continuous internal female thread, the crest of said female thread in each of at least several convolutions having a plurality of circumferentially uniformly spaced lands located closer to the center of said aperture than the intervening portions thereof, the flanks and root of said female thread in each of the several convolutions aforesaid being uniformly spaced from the axis of said female member throughout the circumferential extent thereof, said female member having a maximum internal thread height no greater than .61343p, p being the thread pitch, said female member being adapted to mate with the external thread of a male member having an external thread height less than .61343p and having a root uniformly spaced from the axis of said male member a distance greater than the spacing of said lands from the center of said aperture so as to provide interference between the crest of said female thread and the root of said male thread, said female member being substantially free running on a standard Unified bolt having an external thread height of no less than .61343p.

References Cited

UNITED STATES PATENTS

| | | | |
|---|---|---|---|
| 2,054,393 | 9/1936 | Sharp | 151—21 |
| 2,190,174 | 2/1940 | MacDonald | 151—22 |
| 2,437,638 | 3/1948 | Evans | 151—22 |
| 2,452,192 | 10/1948 | Hosking | 151—21 |
| 2,754,871 | 7/1956 | Stoll | 151—21 |
| 3,029,856 | 4/1962 | Abbott | 151—21 |
| 3,081,808 | 3/1963 | Rosan | 151—21 |

EDWARD C. ALLEN, *Primary Examiner.*

CARL W. TOMLIN, *Examiner.*

M. PARSONS, JR., *Assistant Examiner.*

UNITED STATES PATENT OFFICE
CERTIFICATE OF CORRECTION

Patent No. 3,353,581            November 21, 1967
   Edwin R. Evans, deceased, by The Detroit Bank and
        Trust Company, executor It is hereby certified that error appears in the above numbered patent requiring correction and that the said Letters Patent should read as corrected below.

Column 8, line 20, after "female" insert -- member --.

Signed and sealed this 31st day of December 1968.

(SEAL)
Attest:

Edward M. Fletcher, Jr.                    EDWARD J. BRENNER
Attesting Officer                          Commissioner of Patents